United States Patent

Sonoda

Patent Number: 5,089,075
Date of Patent: Feb. 18, 1992

[54] PRODUCTION OF BREATHING COMPOSITE SHEET

[75] Inventor: Takefumi Sonoda, Mie, Japan

[73] Assignee: Tosoh Corporation, Yamaguchi, Japan

[21] Appl. No.: 515,396

[22] Filed: Apr. 27, 1990

[30] Foreign Application Priority Data

| Apr. 28, 1989 | [JP] | Japan | 1-107374 |
| Jul. 18, 1989 | [JP] | Japan | 1-183797 |
| Aug. 11, 1989 | [JP] | Japan | 1-206651 |

[51] Int. Cl.⁵ ............................................. B32B 31/00
[52] U.S. Cl. ..................... 156/244.18; 156/252; 156/510; 29/132; 29/DIG. 47
[58] Field of Search ............... 156/244.11, 244.18, 156/244.27, 251, 252, 513, 515, 518, 244.24, 244.25, 253; 29/121.1, 132

[56] References Cited

U.S. PATENT DOCUMENTS

| 3,095,315 | 6/1963 | Magill, Jr. et al. | 152/244.24 |
| 3,161,554 | 12/1964 | Blackford | 156/252 |
| 3,686,731 | 8/1972 | Koovi et al. | 29/132 |
| 3,893,795 | 7/1975 | Nauta | 29/121.1 |
| 4,652,326 | 3/1987 | Spielau et al. | 156/244.11 |
| 4,995,930 | 2/1991 | Merz et al. | 152/244.18 |

FOREIGN PATENT DOCUMENTS 0125465 11/1978 Japan .............................. 156/244.18

OTHER PUBLICATIONS

Japanese Patent Public Disclosure No. 58-163657; Sep. 28, 1983.
Japanese Patent Public Disclosure No. 61-241137; Oct. 27, 1986.

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

Breathing composite sheet can be produced from a thermoplastic resin and a porous substrate, such as a non-woven fabric sheet, by extrusion-laminating technique using a specified cooling roll, the surface of which has been at least partly modified with a covering material having specified ranges of thermal conductivity and hardness properties. The extruded molten thermoplastic film carried on the porous substrate is effectively perforated at the modified surface of the cooling roll so as to give a breathing composite sheet.

4 Claims, 7 Drawing Sheets

PRODUCTION OF BREATHING COMPOSITE SHEET

BACKGROUND OF THE INVENTION

This invention relates to production of breathing composite sheets comprising a porous substrate such as nonwoven fabric and a thermoplastic film.

Recently, various types of breathing composite sheets comprising a porous substrate in combination with a perforated film component that functions to regulate water permeability, moisture permeability, water resistance and other properties have been used in a wide variety of applications. Typical examples of the products which may be mentioned include paper diaper; hygenic pad; electrochemical cell separator; packages for desiccant, disoxidant and the like; dust proof clothing; filter; dew-proof wall sheet; and water transmitting sheet used in concrete mold. The methods for producing these breathing sheet materials may fall generally into the following two categories:

1. Methods in which a film is prepared from a thermoplastic resin blended with an inorganic or organic filler and the film is subjected to a treatment for perforating the film, for example, by orientation of the film or by removal or extraction of the filler from the film, and thereafter the perforated thermoplastic film is bonded to a porous substrate.

2. Methods in which a thermoplastic resin film and a porous substrate are bonded together and then the thermoplastic film is perforated, for example, by corona discharge treatment or by needle-punching.

All these methods comprise at least two separate steps, i.e. a step of perforating a thermoplastic film and a step of bonding the film to a porous substrate. Naturally, these separate steps are undesirable and disadvantageous from the standpoints of the quality control and the process control and need two kinds of apparatuses, i.e. a perforator apparatus and a bonding equipment, which cost a good deal of plant and equipment investment. These result in a drawback that it is difficult to manufacture the products at a low cost.

SUMMARY OF THE DISCLOSURE

A primary object of the present invention is to provide a method in which perforation of a thermoplastic film is effected concurrently with bonding of the film to a porous substrate, such as nonwoven fabric. Such a concurrent processing has never been achieved in the conventional methods.

Under the state of art as above-mentioned, we have eagerly discussed as to how the problems of the conventional methods can be solved and now have found that, when a thermoplastic resin is extrusion-laminated onto the surface of a porous substrate, the laminated thermoplastic film may be perforated, if the surface of a roll that is brought into direct contact with the extruded molten thermoplastic film has a thermal conductivity within a specific range as well as a hardness within a specific range. The present invention is based on this discovery.

Accordingly, the present invention relates to a method for preparing a breathing composite sheet from a thermoplastic resin and a porous substrate by extrusion-laminating technique, wherein a modified roll is employed to perforate an extruded molten thermoplastic film carried on the porous substrate, at least part of the surface of the roll with which the extruded molten thermoplastic film is brought into direct contact being formed of a material having a thermal conductivity within the range of from 0.03 kcal/m·hr·°C. to 5 kcal/m·hr·°C. and a hardness of not less than HDA 60 as measured in accordance with the method of JIS (Japanese Industrial Standard) K7215.

DETAILED DESCRIPTION OF THE INVENTION

The invention will be illustrated in more detail.

Figure 1:
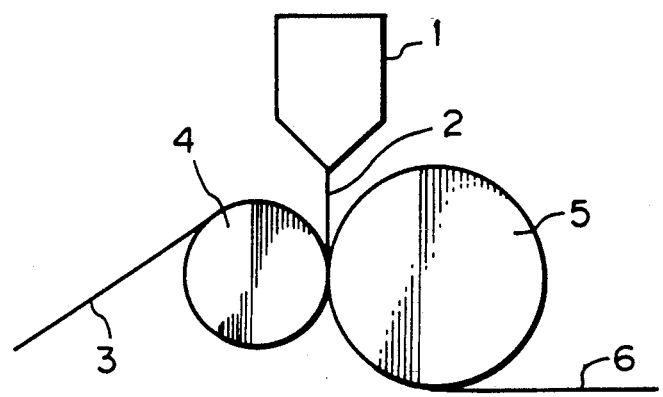
FIG. 1 is a schematic view of an extrusion-laminating apparatus which may be used in the invention.

The accompanying FIG. 1 shows diagrammatically a typical apparatus which may be used in the present invention. A T-die 1 extrudes a molten thermoplastic film 2 which is then pressed and bonded to a porous substrate 3 through a nip between a rubber roll 4 and a cooling roll 5 having a surface composed of a specially selected material. The film becomes perforated while it is in contact with the surface of the cooling roll so as to give a breathing composite sheet product 6.

While FIG. 1 shows the production of a two-layer structure composed of a porous substrate layer and a thermoplastic film layer, it would be appreciated that the product breathing composite sheet 6 of the two-layer structure may be fed as a substrate again to an extrusion-laminating apparatus to laminate a further layer of thermoplastic resin on the other surface opposite to the laminate-carrying surface of the composite sheet and then the additional thermoplastic layer is perforated in accordance with the invention, thereby to give a breathing three-layer composite sheet composed of a core layer of porous substrate sandwitched between two outer layers of perforated thermoplastic films.

The breathing composite sheets of the present invention may be produced using either a single laminating apparatus with an extruder or a tandem laminating apparatus with two extruders, provided that the roller (or rollers) that is brought into contact with the extruded thermoplastic material while in the molten state has a contact surface made of a material satisfying the above-specified thermal conductivity and hardness criteria.

The cooling roll which may be used in the present invention may be formed by covering a metallic roll with a material of the required physical characteristics. Alternatively, the whole of the cooling roll may be formed of such a material. The materials with which the metallic roll is covered to produce the cooling roll or from which the cooling roll formed should have a thermal conductivity of about 0.03 to 5 kcal/m·hr·°C., preferably 0.1 to 1 kcal/m·hr·°C. and more preferably 0.1 to 0.6 kcal/m·hr·°C. Thermal conductivity in excess of about 5 kcal/m·hr·°C. does not effectively cause the perforation of thermoplastic film, on the other hand thermal conductivity of less than about 0.03 kcal/m·hr·°C. represent a poor cooling capacity and would give rise to a seriously low production speed.

The material from which at least part of the surface of the cooling roll is formed should have a hardness of greater than HDA 60, and preferably greater than HDA 80, as measured in accordance with JIS K 7215. Hardness of less than HDA 60 is insufficient to satisfactorily bond the thermoplastic film to the porous substrate, and also tends to give rise to a poor perforation. When the cooling roll for use in the present invention is prepared by covering a metallic roll with a material having the required physical characteristics, the surface covering may be either of a single layer structure made of a single material or of a multi-layer structure made of the same single material. The surface covering may be of a multi-layer structure made of different materials. The surface covering of the cooling roller may be prepared from a suitable blend or mixture of plural components and may be either of a single layer or multi-layer structure. Where the surface covering is of a multi-layer structure or of a mixture of materials, it should be understood that the thermal conductivity and hardness properties of the covering are apparent mean values of those of the respective layers or components or actually measured values. The materials used as the covering may be selected depending on the nature of the thermoplastic resin to be extrusion-laminated and various conditions employed in the extrusion-lamination process.

Specific examples of the materials for use in covering the cooling roll include elastomers such as silicone rubbers, polyurethane rubbers and chloroprene rubber; thermoplastic and thermosetting resins such as polyamides, phenol resins, silicone resins, fluoroplastics, polyacetals, polycarbonate resins, polyphenylene oxide resins, polyphenylene sulfide resins, melamine resins, urea resins and cellulosic resins; emulsions and varnishes of the above-listed materials; paper; ceramics; glass-fiber mat; etc.

Where a polyolefin resin, for example, low or high density polyethylene, polypropylene, or ethylene-vinyl acetate copolymer is to be extrusion-laminated, fluoroplastics are conveniently employed as material for covering the cooling roll from the viewpoint of their practical performances such as excellent roll release and thermal resistance properties.

The covering layer may be provided over the whole peripheral surface of the cooling roll or on a selected part or parts of the surface. By provision of the covering layer on the selected part or parts of the peripheral surface, a breathing composite sheet having areas of a moisture permeability different from the remainder part may be produced with ease. In the case where the covering layer is provided over the whole peripheral surface of the cooling roll, the surface of the extrusion-laminated molten thermoplastic film that is brought into contact with the cooling roll will be perforated and thus be rendered permeable to gases and moisture over the whole area.

While in the case where the covering layer is provided only on the selected part or parts of the surface of cooling roll, only the surface area or areas of the extrusion-molded molten thermoplastic film that are brought into contact with the covered area or areas will be perforated and thus rendered permeable to gases and moisture.

Figure 2:
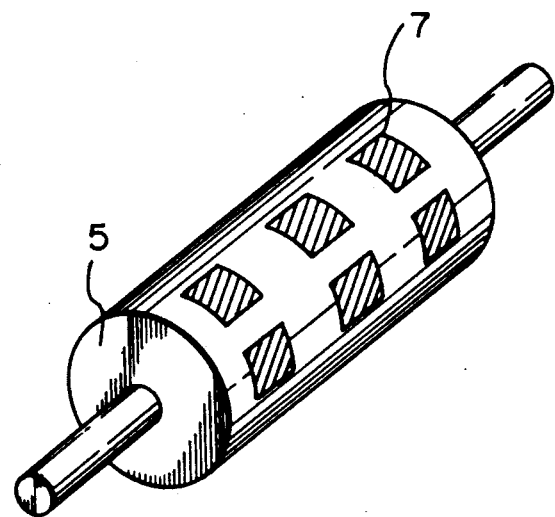
FIG. 2 is a perspective view of a cooling roll having a surface that is partly modified in accordance with the invention.

FIG. 2 diagrammatically shows an example of a cooling roll having a peripheral cooling surface on parts of which a covering layer according to the invention is applied in a regular pattern.

Figure 3:
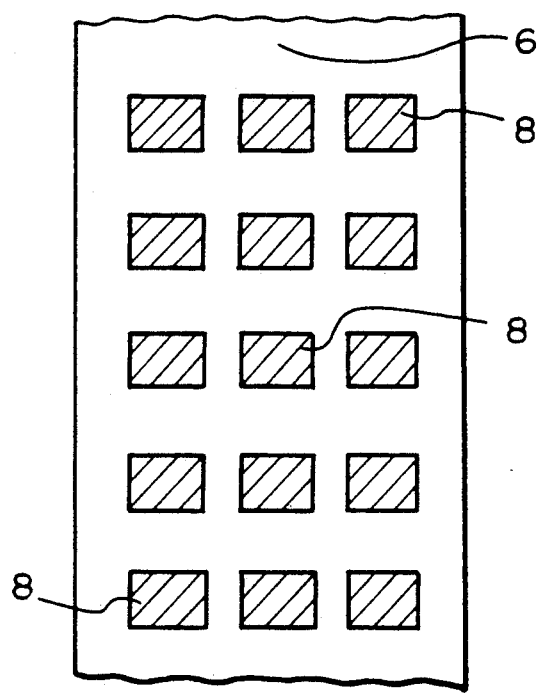
FIG. 3 is a diagrammatic view of the surface of breathing composite sheet having a pattern of perforated areas 8 produced using the partly covered cooling roll of FIG. 2.
Figure 4:
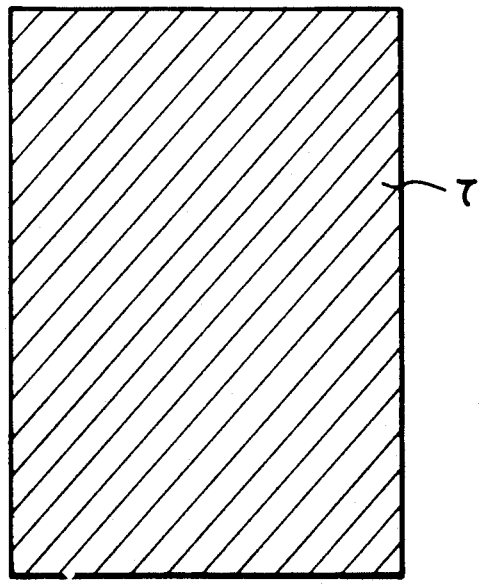
FIG. 4 is an expansional view of a covered surface of cooling roll.
Figure 5:
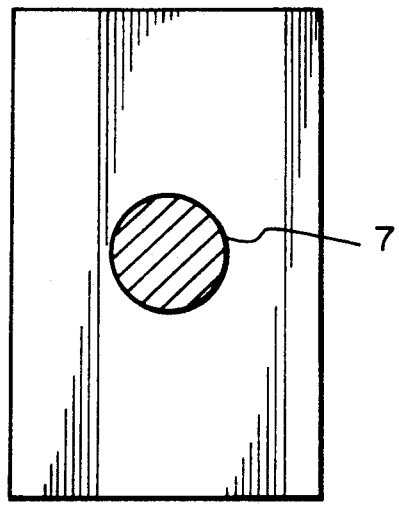
FIGS. 5–11 are expansional views of partly covered surfaces 7 of some cooling rolls which may be used in the invention.
Figure 6:
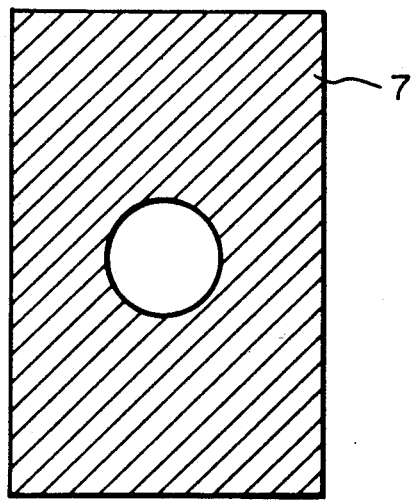
Figure 7:
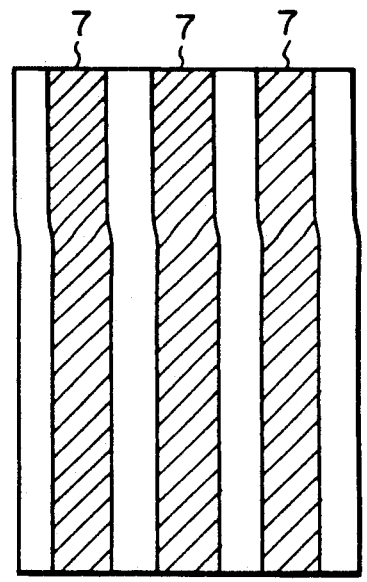

FIG. 3 shows a diagrammatical plan view of a breathing composite sheet product prepared by extrusion-laminating a thermoplastic resin onto a porous substrate material with the partly covered cooling roll shown in FIG. 2.

The proportion of the sum of covered surface areas to the whole surface area of the cooling roll and the pattern and configuration of the covered areas may be appropriately selected depending on the intended final uses of the product sheets. The configuration of the covered areas may be a definite one such as a circle, rectangular, square, triangular or elliptic form, or any indefinite or irregular one. The configuration of the covered area, however, should have a minimum width of about 1 mm, and preferably of 3 mm, because it may be difficult to cause the perforation of the extrusion-laminated film at parts of covering layer having a width of less than 1 mm.

In order to achieve a practically acceptable breathability in the product sheet, the total area covered with the covering layer should be at least 0.05% of the whole surface area of the cooling roll. Several non-limiting examples of the configurations of covering layers applied on the cooling rolls are given as expansional views in FIGS. 4–11.

The techniques for applying the covering layer on the whole peripheral surface of the cooling roll include, for example, painting, powder coating, encasing in heat-shrinkable tubing, lining, casting and flame spraying. Where the covering material is in the form of a film or mat, it may be firmly bonded to the surface of roll by means of adherent.

The thickness of the covering layer is greater than about 5 $\mu$m but less than 100 mm, preferably greater than about 10 $\mu$m but less than about 50 mm and more preferably greater than 10 $\mu$m but less than 5 mm. When the thickness is less than 5 $\mu$m, the covering layer tends to be detached from the roll due to, for example, physical damage or scuffing and thus to expose the surface of the cooling roll. Where the thickness of the covering layer is greater than 100 mm, such a thick layer tends to accumulate heat therein with time during the extrusion-lamination process and the accumulated heat will make the roll-release property poor; and in an extreme case, the composite sheet would be seriously wound around the cooling roll and give no satisfactory composite sheet product.

Where the covering layer is applied on a selected part or parts of the roll, at first the surface of a metallic cooling roll is carved to form indentation(s) in a pattern corresponding to the area or areas to be covered with the material of the specified properties. Then the indented area or areas are filled up with a selected material of the specified properties by a technique such as coating casting, flame spraying, lining or powder coating. And finally, the thus treated surface of the roll is polished to give a cooling roll that may be suitable for carrying out the present invention.

Alternatively, a cooling roll which may be used in the present invention can be prepared by firmly bonding a suitably patterned piece or pieces of a film or sheet material of the specified properties onto the surface of roll by means of an adhesive or the like.

The depth of the indentation may depend upon the design requirements of the cooling roll and ranges from about 5 μm to about 50 mm, preferably from 10 μm to 5 mm. Where the depth of indentation is less than 5 μm, the coated material embedded in the indentation tends to be detached from the roll surface, for example due to damage or failure thereof, and hence the surface of roll may become accidentally uncovered. Where the depth exceeds 50 mm, the covering material will accumulate heat with time during the operation so that the releasability of roll may become poor.

In the case where the suitably patterned piece or pieces of film or sheet having the specified properties are bonded onto the surface of cooling roll, the thickness of the film or sheet is in the range of from about 5 μm to 500 μm, preferably from 10 μm to 200 μm. If the thickness is less than about 5 μm, then the bonded pieces tend to be detached from the surface of roll, for example due to damage or failure thereof, and hence the surface of roll may become uncoated. If the thickness of the bonded sheet is greater than 500 μm, then a very poor adhesion may be achieved between the thermoplastic film and the porous substrate in the areas where the laminate of thermoplastic film and substrate does not contact with the bonded pieces of sheet on the cooling roll, depending on the total thickness of the laminate passing over the cooling roll.

Examples of the porous substrate which may be used in the invention include nonwoven, woven and mixed nonwoven fabrics formed of synthetic and/or natural fibers such as of polyesters, high density polyethylene, polypropylene, nylons, rayons and the like; paper sheets of rough surface such as tissue paper; and inorganic nonwoven and woven fabrics, for example of glass fibers, rock wool and the like.

The porosity of the porous substrate should be not greater than 97%, preferably not greater than 90%. If the porosity is greater than 97%, a sufficient contact may not achieved between the porous substrate and the thermoplastic film during the extrusion-lamination stage so that an unsatisfactory perforation of the film may be effected in the subsequent cooling stage.

The surface roughness of the porous substrate should be at least about 1 μm (Ra), preferably about 3 μm (Ra) as expressed as the average value of roughness (Ra) along the center line of specimen, which is measured by the test method for determining surface roughness in accordance with JIS B 0601. Where the roughness is less than about 1 μm (Ra), the thermoplastic film may not be satisfactorily perforated.

In the invention, such a porous substrate material is employed to prepare a breathing film by extrusion-lamination technique. Depending on the nature of the porous substrate material, it is possible to subject the substrate material to a pretreatment, such as corona discharge treatment or anchor coating, before use so that a sufficiently high adhesion strength is achieved between the thermoplastic film and the porous substrate in the extrusion-lamination stage.

Examples of the thermoplastic resins which may be used as film in the invention include low and high density polyethylenes, polypropylene, ethylene-vinyl acetate copolymer resin, polybutene-1 and other polyolefin resins, ionomer resins, polyamides, etc. The temperature to which the thermoplastic resin is heated during the process may be readily and appropriately selected, for example, by bearing in mind the adhesion between the porous substrate and thermoplastic resin materials used.

The thickness of the thermoplastic film or sheet to be laminated is dependent upon the surface roughness of the porous substrate to be used with that film or sheet. However, if the thickness of the laminate is greater than about 1 mm, an insufficient contact is achieved between the laminate and the porous substrate and often results in a poor perforation of the laminate film. The lower limit of the thickness of laminate may be governed by the processability, such as drawdown property, of the thermoplastic resin used. Though the line speed depends upon factors, such as the size of the apparatus employed, the perforation of thermoplastic film appears to be generally promoted at higher line speeds.

Though the perforation of thermoplastic film or sheet is generally enhanced as the temperature of the coolant water in the cooling roll is high, the temperatures exceeding about 70° C. will give rise to a poor releasability on the surface of cooling roll, depending on the nature of the thermoplastic material, and in an extreme case, the thermoplastic material will be wound onto the roll and the production will be made impossible to continue.

Preferably, the linear pressure of the press rollers for contacting the porous substrate with the extruded thermoplastic film should be high. However, where the linear pressure of the press rollers is greater than about 45 kg/cm and if the cooling roll (one of said press rollers) has the covering layer of the specified properties, then the durability of the covering layer will become undesirably poor.

According to the method of the present invention, it is possible to produce with ease a breathing composite sheet having perforated regions that exhibit a moisture permeability in the range of about 500 g/m$^2 \cdot$24 hrs. to about 8000 g/m$^2 \cdot$24 hrs. as determined in accordance with the test method of JIS Z 0208 (at a temperature of 40° C. and a humidity of 90%), said range of moisture permeability being very useful in the applications of breathing sheets. The perforation according to the present method is caused on one or both sides of the respective fibers of the porous substrate material. The shape or configuration of the formed perforations is elliptical or crazy or streaky. The length of the perforations ranges from about 3 μm to about 100 μm.

EXAMPLE

The invention will be further illustrated with reference to the following non-limiting examples.

EXAMPLE 1

A commercially available extrusion-lamination apparatus (manufactured by PURAKOH Kabushiki Kaisha; Model TP-350) provided with a 25 mm$\phi$ extruder was used. A steel cooling roll (200 mm outer diameter; 350 mm length) which was attached to said apparatus was covered with a heat-shrinkable fluorine plastic tube so as to provide a covering layer on whole the surface of said cooling roll. The thickness of the covering layer was 1 mm as measured in accordance with the method of JIS 7215. The covering layer exhibited a hardness of HDA 95 and a thermal conductivity of 0.28 kcal/m·hr·°C.

The extrusion-lamination apparatus now having the cooling roll modified with the covering layer was used to extrusion-laminate a layer of a low density polyethylene (available under a trade name "Petrothene" 203 from TOSOH Corp.; MI 8; density 0.919 g/cm$^3$) onto a surface of a commercially available polyester nonwoven fabric substrate (Asahi Chemical Industry Co., Ltd.; trade mark "E-5070"; basis weight 70 g/m$^2$; porosity 70%; surface roughness 6 μm Ra) under the following process conditions.

| | |
|---|---|
| Resin temperature: | 305° C. |
| Line speed: | 30 m/min. |
| Laminate thickness: | 15 μm |
| Linear pressure at press rollers: | 10 kg/cm |
| Temperature of water circulating within the covered cooling roll: | 20° C. |

The thus prepared breathing composite sheet exhibited the moisture permeability, hydraulic pressure resistance and breathability properties as shown in Table 1 below.

The moisture permeability was determined in accordance with JIS Z 0208. The hydraulic pressure resistance was determined in accordance with JIS L 1092. The breathability was determined in accordance with JIS P8117.

Figure 12:
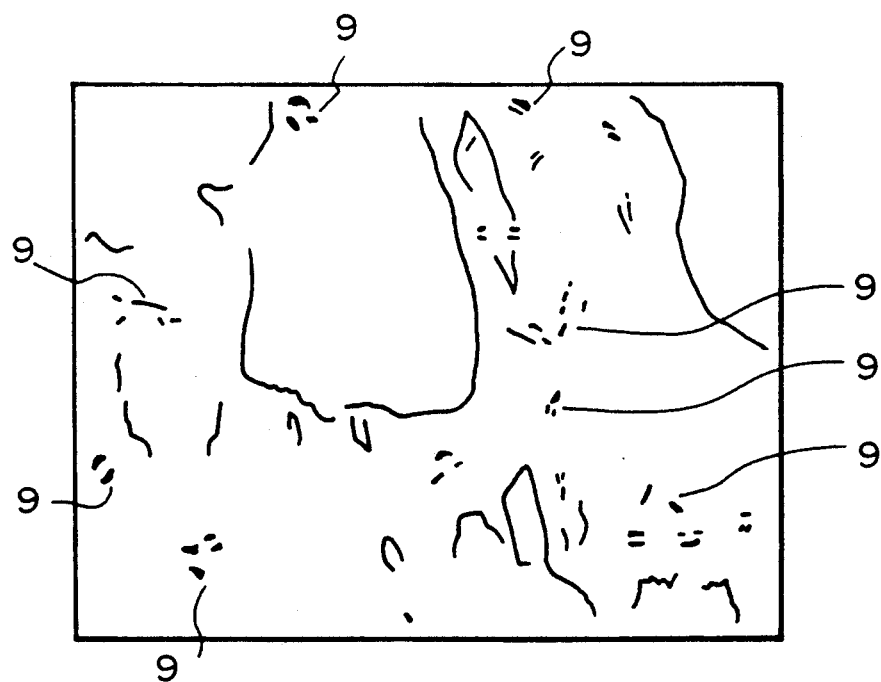
FIG. 12 is a schematic reproduction of an electron photomicrograph (X76 magnification) of the thermoplastic surface of the breathing composite sheet obtained in Example 1.
Figure 13:
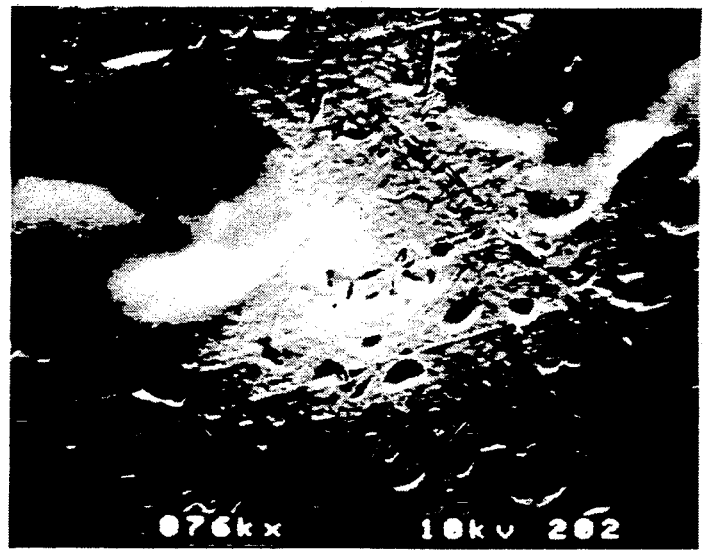
FIG. 13 is an electron photomicrograph (X76 magnification) of the product of Example 1.

A schematic reproduction of an electron photomicrograph of the thermoplastic film surface of the above breathing composite sheet product is shown in FIG. 12 with a X76 magnification.

EXAMPLE 2

The cooling steel roll of the extrusion-lamination apparatus as used in Example 1 was coated with a fluorine plastic powder to provide a covering layer on whole the surface thereof. The thickness of the covering layer was 35 μm. The covering layer had a hardness of HDA 95 and a thermal conductivity of 0.28 kcal/m·hr·°C. The apparatus provided with the above coated cooling roll was used under the process conditions as described in Example 1 to produce a breathing composite sheet, which had the moisture permeability, hydraulic pressure resistance and breathability properties as shown in Table 1.

EXAMPLE 3

The metallic cooling roll of the extrusion-lamination apparatus as used in Example 1 was lined with a silicone rubber to provide a covering layer on whole the surface of said cooling roll. The covering layer was 5 mm thick and had a hardness of HDA 89 and a thermal conductivity of 0.18 kcal/m·hr·°C.

The apparatus provided with the thus lined cooling roll was used under the process conditions as described in Example 1 to produce a breathing composite sheet, which had the moisture permeability, hydraulic pressure resistance and breathability properties as shown in Table 1.

EXAMPLE 4

A commercially available extrusion-lamination apparatus (manufactured by MUSASHINO SEKKEI JIMUSHO Co., Ltd.; Model S-270) provided with a 90 mm$^\phi$ extruder was used. The apparatus contained a cooling steel roll plated with a 150 μm copper layer and a 20 μm thick nickel/chromium layer, said roll having a 600 mm outer diameter and a 900 mm length.

The cooling roll was covered with a craft paper/low density polyethylene/silicone resin three-layer laminated structure to provide a covering layer on whole the surface of said roll. The silicone resin layer was disposed to directly contact with a molten plastic extrudate or laminate in the process. The craft paper, low density polyethylene and silicone resin layers were 80 μm, 25 μm and 3 μm thick, respectively. The above composite covering sheet exhibited a hardness of HDA 95 as measured on a pile of 20 sheets. The covering sheet showed an apparent thermal conductivity of 0.19 kcal/m·hr·°C.

The extrusion-lamination apparatus now provided with the cooling roll modified with the covering layer was used to extrusion-laminate a layer of a low density polyethylene ("Petrothene" 203 ex TOSOH Corp.; MI 8; density 0.919 g/cm$^3$) onto a surface of a commercially available polyester non-woven fabric substrate (Asahi Chemical Industry; E-5030; basis weight 30 g/m$^2$; porosity 80%; surface roughness 5.5 μm Ra) under the following process conditions.

| | |
|---|---|
| Resin temperature: | 305° C. |
| Line speed: | 150 m/min. |
| Laminate thickness: | 25 μm |
| Linear pressure at press rollers: | 18 kg/cm |
| Temperature of water circulating within the covered cooling roll: | 20° C. |

The thus prepared breathing composite sheet exhibited the moisture permeability, hydraulic pressure resistance and breathability properties as shown in Table 1.

EXAMPLE 5

Figure 8:
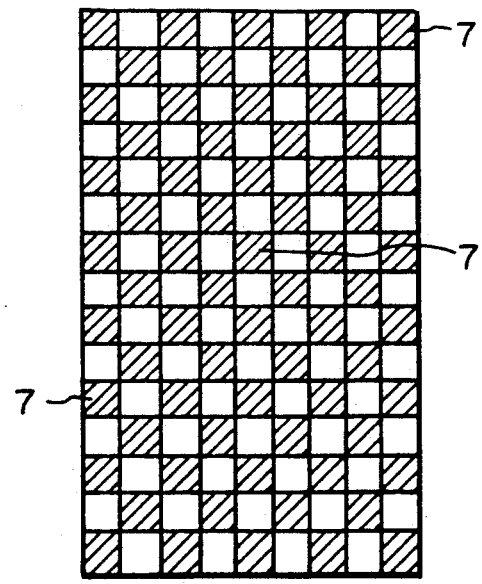
Figure 9:
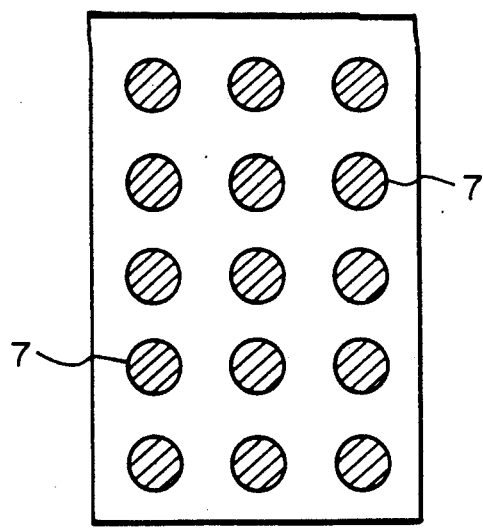
Figure 10:
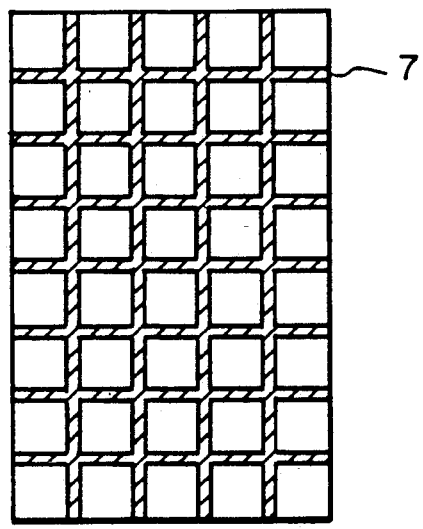
Figure 11:
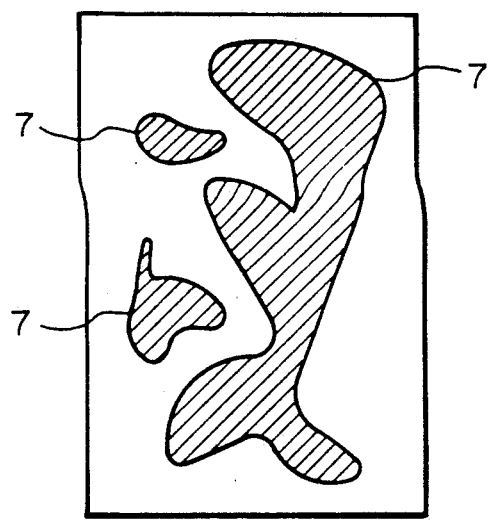

A cooling roll made of steel having an outer diameter of 191 mm and a length of 350 mm was machine-engraved to form indentations in a shepherd's check pattern corresponding to the partly covered areas of roll surface as shown in the expanded view of FIG. 8. The indentations had a depth of 100 μm and an opening of 10 mm. The proportion of the sum of the covered areas to the total surface area of the roll was 50%.

The thus engraved cooling roll was powder-coated with a fluorine resin to fully fill the indentations. Then the roll surface was smoothened by polishing to give a finished surface which was partly covered in the shepherd's check pattern. The covering layer fitted in each of the indentations had a thermal conductivity of 0.28 kcal/m·hr·°C. and a hardness of HDA 95 (as measured in accordance with JIS 7215). The naked steel roll surface free of the fluorine resin coverings showed a thermal conductivity of 45 kcal/m·hr·°C. and a hardness of HDA 100.

The thus covered cooling roll was attached to an extrusion-lamination apparatus (Model TP-350 manufactured by PURAKOH) provided with a 25 mm$^\phi$ extruder. Then the apparatus was used to extrusion-laminate a layer of a low density polyethylene ("Petrothene" 203 ex TOSOH Corp.; MI 8; density 0.919 g/cm$^3$) onto a surface of a polyester nonwoven fabric substrate (Asahi Chemical Industry; E-5070; basis weight 70 g/m$^2$; porosity 70%; surface roughness 6 μm Ra) under the following process conditions.

| | |
|---|---|
| Resin temperature: | 305° C. |
| Line speed: | 30 m/min. |
| Laminate thickness: | 15 μm |

| | |
|---|---|
| Linear pressure at press rollers: | 10 kg/cm |
| Temperature of water circulating within the covered cooling roll: | 20° C. |

The thus prepared breathing composite sheet exhibited the moisture permeability, hydraulic pressure resistance and breathability properties as shown in Table 1.

EXAMPLE 6

The procedure as described in Example 5 was repeated except that, in place of the partly covered cooling roll having a plurality of pattern units of a 10 mm×20 mm size each consisting of a covered area of 10 mm×10 mm square and a naked metallic area of 10 mm×10 mm square, a partly covered cooling roll having a plurality of pattern units of a 10 mm×20 mm size each consisting of a covered area of 10 mm×15 mm rectangle and a naked metallic area of 10 mm×5 mm rectangle (thus the proportion of the sum of the covered areas to the total surface area being 75%) was used under the same process conditions. The resulting breathing composite sheet product exhibited the moisture permeability, hydraulic pressure resistance and breathability properties as shown in Table 1.

EXAMPLE 7

The procedure as described in Example 5 was repeated except that, in place of the partly covered cooling roll having a plurality of pattern units of a 10 mm×20 mm size each consisting of a covered area of 10 mm×10 mm square and a naked metallic area of 10 mm×10 mm square, a partly covered cooling roll having a plurality of pattern units of a 10 mm×20 mm size each consisting of a covered area of 10 mm×5 mm rectangle and a naked metallic area of 10 mm×15 mm rectangle (thus the proportion of the sum of the covered areas to the total surface area being 25%) was used under the same process conditions. The resulting breathing composite sheet product exhibited the moisture permeability, hydraulic pressure resistance and breathability properties as shown in Table 1.

EXAMPLE 8

An extrusion-lamination apparatus (Model TP-350 manufactured by PURAKOH) provided with a 25 mm$^\phi$ extruder was used. A steel cooling roll (200 mm outer diameter; 350 mm length) which was attached to said apparatus was covered with a heat-shrinkable fluorine plastic tube so as to provide a covering layer on whole the surface of said cooling roll. The thickness of the covering layer was 1 mm as measured in accordance with the method of JIS 7215. The covering layer exhibited a hardness of HDA 95 and a thermal conductivity of 0.28 kcal/m·hr·°C.

The extrusion-lamination apparatus now having the cooling roll modified with the covering layer was used to extrusion-laminate a layer of a low density polyethylene ("Petrothene" 203 ex TOSOH Corp.; MI 8; density 0.919 g/cm$^3$) onto a surface of a polyester nonwoven fabric substrate (Asahi Chemical Industry; E-5070; basis weight 70 g/m$^2$; porosity 70%; surface roughness 6 μm Ra) under the following process conditions.

| | |
|---|---|
| Resin temperature: | 305° C |
| Line speed: | 30 m/min. |
| Laminate thickness: | 15 μm |
| Linear pressure at press rollers: | 10 kg/cm |
| Temperature of water circulating within the covered cooling roll: | 20° C. |

The thus prepared two-layer structure was used as a porous substrate material. The above procedure was repeated under the same conditions to extrusion-laminate a further layer of low density polyethylene onto the unlaminated surface of the polyester nonwoven fabric layer so as to produce a breathing composite sheet of a three-layer structure comprising a core layer of polyester nonwoven fabric substrate and two outer layers of perforated low density polyethylene films.

The resulting breathing three-layer composite sheet product exhibited the moisture permeability, hydraulic pressure resistance and breathability properties as shown in Table 1.

EXAMPLE 9

An extrusion-lamination apparatus (manufactured by MUSASHINO SEKKEI JIMUSHO Co., Ltd.; Model S-270) provided with a 90 mm$^\phi$ extruder was used. The apparatus contained a cooling steel roll plated with a 150 μm copper layer and a 20 μm thick nickel/chromium layer, said roll having a 600 mm outer diameter and a 700 mm length.

The cooling roll was covered with a craft paper/low density polyethylene/silicone resin three-layer laminated structure to provide a covering layer on whole the surface of said roll. The silicone resin layer was disposed to directly contact with a molten plastic extrudate or laminate in the process. The craft paper, low density polyethylene and silicone resin layers were 80 μm, 25 μm and 3 μm thick, respectively. The above composite covering sheet exhibited a hardness of HDA 95 as measured on a pile of 20 sheets. The covering sheet showed an apparent thermal conductivity of 0.19 kcal/m·hr·°C.

The extrusion-lamination apparatus now provided with the cooling roll modified with the covering layer was used to extrusion-laminate a layer of a low density polyethylene ("Petrothene" 203 ex TOSOH Corp.; MI 8; density 0.919 g/cm$^3$) onto a surface of a commercially available polyester non-woven fabric substrate (Asahi Chemical Industry; E-5030; basis weight 30 g/m$^2$; porosity 80%; surface roughness 5.5 μm Ra) under the following process conditions.

| | |
|---|---|
| Resin temperature: | 305° C. |
| Line speed: | 150 m/min. |
| Laminate thickness: | 25 μm |
| Linear pressure at press rollers: | 18 kg/cm |
| Temperature of water circulating within the covered cooling roll: | 20° C. |

The thus prepared two-layer structure was used as a porous substrate material. The above procedure was repeated under the same conditions to extrusion-laminate a further layer of low density polyethylene onto the unlaminated surface of the polyester nonwoven fabric layer so as to produce a breathing composite sheet of a three-layer structure comprising a core layer of polyester nonwoven fabric substrate and two outer layers of perforated low density polyethylene films.

The resulting breathing three-layer composite sheet product exhibited the moisture permeability, hydraulic pressure resistance and breathability properties as shown in Table 1.

COMPARATIVE EXAMPLE 1

The procedure of Example 1 was repeated using the extrusion-lamination apparatus with the unmodified cooling roll as supplied. The resulting composite sheet product exhibited the moisture permeability, hydraulic pressure resistance and breathability as shown in Table 1.

The metallic cooling roll was made of steel and a thermal conductivity of 45 kcal/m·hr·°C. and a hardness of HDA 100 were found on the surface thereof. The moisture permeability, hydraulic pressure resistance and breathability properties of the resulting composite sheet are shown in Table 1.

COMPARATIVE EXAMPLE 2

The surface of the steel cooling roll in the extrusion-lamination apparatus as used in Example 1 was plated with a 150 μm thick copper layer and then 20 μm thick nickel/chromium layers. The plated covering layer had an apparent thermal conductivity of 97 kcal/m·hr·°C. and a hardness of HDA 100. The procedure of Example 1 was repeated using the plated cooling roll in place of the modified roll of Example 1. The moisture permeability, hydraulic pressure resistance and breathability properties of the resulting composite sheet are shown in Table 1.

COMPARATIVE EXAMPLE 3

The procedure of Example 3 was repeated except that the cooling roll was covered with a silicone rubber exhibiting a hardness of HDA 40. The moisture permeability, hydraulic pressure resistance and breathability properties of the resulting composite sheet are shown in Table 1.

COMPARATIVE EXAMPLE 4

The procedure of Example 4 was repeated except that in this case the cooling roll was not covered with the craft paper/low density polyethylene/silicone resin three-layer structure. The cooling roll had a thermal conductivity of 97 kcal/m·hr·°C. and a hardness of HDA 100. The moisture permeability, hydraulic pressure resistance and breathability properties of the resulting composite sheet are shown in Table 1.

TABLE 1

| | Moisture Permeability (g/m².24 hrs) | Hydraulic Pressure Resistance (mm) | Breathability (s/100 cc) |
|---|---|---|---|
| Example | | | |
| 1 | 2500 | 410 | 15 |
| 2 | 1800 | 480 | 25 |
| 3 | 1400 | 500 | 48 |
| 4 | 4500 | 300 | 4 |

TABLE 1-continued

| | Moisture Permeability (g/m².24 hrs) | Hydraulic Pressure Resistance (mm) | Breathability (s/100 cc) |
|---|---|---|---|
| 5 | 1100 | 405 | 57 |
| 6 | 1900 | 390 | 26 |
| 7 | 400 | 390 | 350 |
| 8 | 2100 | 630 | 23 |
| 9 | 3900 | 550 | 8 |
| Comparative Example | | | |
| 1 | 30 | >1000 | >1500 |
| 2 | 60 | >1000 | >1500 |
| 3 | 200 | 800 | >1500 |
| 4 | 50 | >1000 | >1500 |

According to the present method, it is possible to perforate a thermoplastic film while laminating the same to a porous substrate material to produce a breathing composite film having a very useful combination of moisture permeability and hydraulic pressure properties. The present method can be carried out at an increased line speed. Further, the present method makes the quality control and process control easy or simple.

Furthermore, according to the present invention, breathing composite sheets having breathing and un-breathing areas or regions may be readily prepared. In addition to the preparation of the thermoplastic resin/porous substrate two-layer sheets, it is possible to prepare breathing three-layer composite sheets consisting of a core layer of porous substrate sandwitched between two outer layers of thermoplastic resin.

What is claimed is:

1. A method for preparing a breathing composite sheet from a thermoplastic resin and a porous substrate by extrusion-laminating technique, wherein a modified roll having a smooth surface is employed to perforate an extruded molten thermoplastic film which has just been extruded onto the porous substrate, at least part of the surface of the roll with which the extruded molten thermoplastic film is brought into direct contact being formed of a material having a thermal conductivity within the range of from 0.03 kcal/m·hr·°C. to 5 kcal/m·hr·°C. and a hardness of not less than HDA 60 as measured in accordance with the method of JIS K7215.

2. A method as claimed in claim 1 wherein the proportion of the total surface area formed from said material to the whole surface area of the roll is not less than 0.05%.

3. A method as claimed in claim 1 wherein the product composite sheet is of a three-layer structure comprising a core layer of said porous substrate and two outer layers of said thermoplastic resin, wherein the two outer layers of said thermoplastic resin are perforated.

4. A method as claimed in claim 2 wherein the product composite sheet is of a three-layer structure comprising a core layer of said porous substrate and two outer layers of said thermoplastic resin, wherein the two outer layers of said thermoplastic resin are perforated.

* * * * *